US012597399B2

(12) United States Patent
Shin et al.

(10) Patent No.: US 12,597,399 B2
(45) Date of Patent: Apr. 7, 2026

(54) DISPLAY DEVICE AND METHOD FOR CONTROLLING THE SAME

(71) Applicant: SAMSUNG ELECTRONICS CO., LTD., Suwon-si (KR)

(72) Inventors: Seungyong Shin, Suwon-si (KR); Kyehoon Lee, Suwon-si (KR); Sungyeol Kim, Suwon-si (KR); Jonghoon Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/769,031

(22) Filed: Jul. 10, 2024

(65) Prior Publication Data

US 2024/0363085 A1 Oct. 31, 2024

Related U.S. Application Data

(63) Continuation of application No. 17/982,165, filed on Nov. 7, 2022, now Pat. No. 12,062,345, which is a (Continued)

(30) Foreign Application Priority Data

May 6, 2020 (KR) ........................ 10-2020-0053672

(51) Int. Cl.
*G09G 3/36* (2006.01)

(52) U.S. Cl.
CPC ....... *G09G 3/3607* (2013.01); *G09G 2310/08* (2013.01); *G09G 2320/0233* (2013.01); *G09G 2320/0271* (2013.01)

(58) Field of Classification Search
CPC .. G09G 3/3607; G09G 3/2011; G09G 3/2081; G09G 3/3233; G09G 3/2025;

(Continued)

(56) References Cited

U.S. PATENT DOCUMENTS 11,862,071 B2 1/2024 Lee et al.
2002/0017643 A1* 2/2002 Koyama ............. G09G 3/3291 257/E27.111

(Continued)

FOREIGN PATENT DOCUMENTS

KR 2003-0044566 A 6/2003
KR 2003-0044567 A 6/2003

(Continued)

OTHER PUBLICATIONS

Search Report (PCT/ISA/210) issued Jun. 10, 2021 by the international Searching Authority for International Application No. PCT/KR2021/001896.

(Continued)

*Primary Examiner* — David Tung
(74) *Attorney, Agent, or Firm* — Sughrue Mion, PLLC

(57) ABSTRACT

A display device, which fixes the magnitude of a driving current flowing through light-emitting devices in a low luminance region and controls an application period of the driving current, includes: light-emitting devices; a processor for controlling the light-emitting devices on the basis of a gray level required for the light-emitting devices in each unit frame; and a timing controller which divides the unit frame into a plurality of sub-frames and generates a scan signal corresponding to each sub-frame. The processor: when the gray level is greater than or equal to a preset value, determines a luminance value of the light-emitting devices on the basis of the gray level and turns on the light-emitting devices with the determined luminance value in all of the plurality of sub-frames; when the gray level is less than the preset value, determines a light-emitting period of the light-emitting devices on the basis of the gray level and divides, on the basis of the light-emitting period, the plurality of sub-frames into a first and a second sub-frame group; turns on the light-emitting devices with a preset luminance value in all (Continued)

sub-frames belonging to the first sub-frame group; and turns off the light-emitting devices in sub-frames belonging to the second sub-frame group or turns on the light-emitting devices with a luminance value less than the preset luminance value.

16 Claims, 11 Drawing Sheets

Related U.S. Application Data continuation of application No. PCT/KR2021/001896, filed on Feb. 15, 2021.

(58) Field of Classification Search
CPC ............. G09G 3/3413; G09G 2310/08; G09G 2310/027; G09G 2320/0233; G09G 2320/0271; G09G 2320/0238
See application file for complete search history.

(56) References Cited

U.S. PATENT DOCUMENTS

| | | | | | |
|---|---|---|---|---|---|
| 2006/0077138 | A1 | 4/2006 | Kim | | |
| 2007/0120877 | A1 | 5/2007 | Ito | | |
| 2007/0258104 | A1 | 11/2007 | Chen | | |
| 2014/0071176 | A1* | 3/2014 | Kim | G09G 3/001 | 345/212 |
| 2015/0042688 | A1 | 2/2015 | Kim | | |
| 2015/0070407 | A1* | 3/2015 | Lee | G09G 3/3233 | 345/76 |
| 2015/0187275 | A1* | 7/2015 | Park | G09G 3/3258 | 345/82 |
| 2017/0140718 | A1 | 5/2017 | Liu | | |
| 2018/0061300 | A1 | 3/2018 | Chen | | |
| 2021/0327331 | A1 | 10/2021 | Zhang | | |

FOREIGN PATENT DOCUMENTS

| | | | |
|---|---|---|---|
| KR | 10-2007-0115621 | A | 12/2007 |
| KR | 10-2008-0080550 | A | 9/2008 |
| KR | 10-2018-0002786 | A | 1/2018 |
| KR | 10-2018-0058037 | A | 5/2018 |
| KR | 10-1942466 | B1 | 4/2019 |
| WO | 2020/004705 | A1 | 1/2020 |

OTHER PUBLICATIONS

Written Opinion (PCT/ISA/237) issued Jun. 10, 2021 by the international Searching Authority for International Application No. PCT/KR2021/001896.

Ji, et al., "Driving circuit technology for flat panel display", 2008, Department of Electrical and Electronics Engineering, 28 pages total.

Office Action dated Feb. 14, 2024, issued by Korean Patent Office in Korean Patent Application No. 10-2020-0053672.

* cited by examiner

DISPLAY DEVICE AND METHOD FOR CONTROLLING THE SAME

CROSS-REFERENCE TO RELATED APPLICATIONS

This application is a Continuation application of U.S. application Ser. No. 17/982,165 filed on Nov. 7, 2022, which is a Continuation application of International Application PCT/KR2021/001896, filed on Feb. 15, 2021, which claims benefit of Korean Patent Application No. 10-2020-0053672, filed on May 6, 2020, at the Korean Intellectual Property Office, the disclosures of which are incorporated herein in their entireties by reference.

BACKGROUND

1. Field

The disclosure relates to a display device and a method of controlling the same, and more specifically, to a display device for controlling a luminance value of a light emitting device by controlling the magnitude and application time of a driving current, and a method of controlling the same.

2. Description of Related Art

In general, a display device is a type of output device that visually displays acquired or stored image information to a user, and is used in various fields, such as homes and businesses.

Examples of a display device include a monitor device connected to a personal computer (PC) or server computer, etc., a portable computer device, a navigation terminal device, a general television device, an Internet Protocol television (IPTV) device, a smart phone, a tablet PC, a personal digital assistant (PDA), a portable terminal device, such as a cellular phone, various display devices used to reproduce images, such as advertisements or movies, at industrial sites, or other various types of audio/video systems, etc.

The display devices may display an image using various types of display panels. For example, the display devices may have a cathode ray tube panel, a light emitting diode (LED) panel, an organic light emitting diode (OLED) panel, a liquid crystal display (LCD) panel, and the like.

In the display device, data lines and gate lines are disposed to intersect each other, and a plurality of pixels corresponding to intersection points of the data lines and gate lines are disposed in a matrix form. In this case, the plurality of pixels receive a data signal from the data lines and receive a scan signal for receiving a data voltage corresponding to each pixel.

Since the luminance of a light emitting device included in the plurality of pixels is controlled by the magnitude of a driving current flowing through the light emitting device, in order to turn on the light emitting device at a low luminance value, a driving current having a small magnitude is required.

However, when the magnitude of the driving current flowing through the light emitting device is small, an error in color coordinates may occur due to the characteristics of the light emitting device.

SUMMARY

The embodiment is directed to providing a display device for controlling an application period of a driving current flowing through a light emitting device in a low luminance region while fixing the magnitude of the driving current.

According to an embodiment, a display device includes: a light emitting device; a processor configured to control the light emitting device based on a gray level required for the light emitting device in each unit frame; and a timing controller configured to divide the unit frame into a plurality of sub-frames and generate scan signals corresponding to the plurality of sub-frames, wherein the processor is further configured to: based on the gray level being greater than or equal to a preset value, determine a luminance value of the light emitting device based on the gray level and turn on the light emitting device at the determined luminance value in the plurality of sub-frames; and based on the gray level being smaller than the preset value, determine a light emission period of the light emitting device based on the gray level, divide the plurality of sub-frames into four sub-frame groups based on the light emission period, turn on the light emitting device at a preset luminance value in the plurality of sub-frames belonging to a first sub-frame group of the four sub-frame groups, and turn off the light-emitting device or turn on the light emitting device at a luminance value smaller than the preset luminance value in the sub-frames belonging to a second sub-frame group of the four sub-frame groups.

A method of controlling a display device including a timing controller configured to divide a unit frame into a plurality of sub-frames and generate scan signals corresponding to the plurality of sub-frames, the method including: determining a gray level required for a light emitting device in the unit frame; based on the gray level being greater than or equal to a preset value, determining a luminance value of the light emitting device based on the gray level and turning on the light emitting device at the determined luminance value in the plurality of sub-frames; and based on the gray level being smaller than the preset value, determining a light emission period of the light emitting device based on the gray level, dividing the plurality of sub-frames into a first sub-frame group and a second sub-frame group based on the light emission period, turning on the light emitting device at a preset luminance value in sub-frames belonging to the first sub-frame group, and turning off the light emitting device or turning on the light emitting device at a luminance value smaller than the preset luminance value in sub-frames belonging to the second sub-frame group.

A display device according to one aspect of the disclosure includes: a light emitting device; a processor configured to control the light emitting device based on a gray level required for the light emitting device in each unit frame; and a timing controller configured to divide the unit frame into a plurality of sub-frames and generate a scan signal corresponding to each of the plurality of sub-frames, wherein the processor is configured to: in response to the gray level being greater than or equal to a preset value, determine a luminance value of the light emitting device based on the gray level and turn on the light emitting device at the determined luminance value in all of the plurality of sub-frames; and in response to the gray level being smaller than the preset value, determine a light emission period of the light emitting device based on the gray level, divide the plurality of sub-frames into a first sub-frame group and a second sub-frame group based on the light emission period, turn on the light emitting device at a preset luminance value in all of the sub-frames belonging to the first sub-frame group, and turn off the light-emitting device or turn on the light emitting device at a luminance value smaller than the preset luminance value in the sub-frames belonging to the second sub-frame group.

In addition, the processor may be configured to: determine sub-frames belonging to the first sub-frame group such that a sum of periods of the sub-frames belonging to the first sub-frame group is shorter than or equal to the light emission period, and a difference between the sum of the periods of the sub-frames belonging to the first sub-frame group and the light emission period is shorter than or equal to a period of one of the plurality of sub-frames; and determine sub-frames not belonging to the first sub-frame group among the plurality of sub-frames as sub-frames belonging to the second sub-frame group.

In addition, the processor may be configured to, in response to the sum of the periods of the sub-frames belonging to the first sub-frame group being equal to the light emission period, turn off the light emitting device in all of the sub-frames belonging to the second sub-frame group.

In addition, the processor may be configured to, in response to the sum of the periods of the sub-frames belonging to the first sub-frame group being shorter than the light emission period, turn on the light emitting device in at least one first sub-frame among the sub-frames belonging to the second sub-frame group at the luminance value smaller than the preset luminance value and turn off the light emitting device in all remaining sub-frames other than the at least one first sub-frame among the sub-frames belonging to the second sub-frame group.

In addition, the processor may be configured to, based on the difference between the sum of the periods of the sub-frames belonging to the first sub-frame group and the light emission period, determine a number of the at least one first sub-frame and a luminance value of the at least one first sub-frame.

In addition, the processor may be configured to, in response to the light emission period being shorter than a period of one of the plurality of sub-frames, determine all of the plurality of sub-frames to be the second sub-frame group, and turn on the light emitting device in at least one first sub-frame among the sub-frames belonging to the second sub-frame group at the luminance value smaller than the preset luminance value and turn off the light emitting device in all remaining sub-frames other than the at least one first sub-frame among the sub-frames belonging to the second sub-frame group.

In addition, the processor may be configured to determine a number of the at least one first sub-frame and a luminance value of the at least one first sub-frame based on the gray level.

In addition, the processor may be configured to, in response to a difference between the light emission period and a period of the unit frame being shorter than a period of one of the plurality of sub-frames, determine one sub-frame among the plurality of sub-frames to be the second sub-frame group; and turn on the light emitting device at a first luminance value smaller than the preset luminance value in the one sub-frame belonging to the second sub-frame group.

In addition, the processor is configured to determine the first luminance value based on the difference between the light emission period and the period of the unit frame.

In addition, the preset luminance value may be a luminance value of the light emitting device when the gray level has the preset value.

A method of controlling a display device according to one aspect of the disclosure, which is a method of controlling a display including a timing controller configured to divide a unit frame into a plurality of sub-frames and generate a scan signal corresponding to each of the plurality of sub-frames, the method including: determining a gray level required for a light emitting device in the unit frame; in response to the gray level being greater than or equal to a preset value, determining a luminance value of the light emitting device based on the gray level and turning on the light emitting device at the determined luminance value in all of the plurality of sub-frames; and in response to the gray level being smaller than the preset value, determining a light emission period of the light emitting device based on the gray level, dividing the plurality of sub-frames into a first sub-frame group and a second sub-frame group based on the light emission period, turning on the light emitting device at a preset luminance value in the sub-frames belonging to the first sub-frame group, and turning off the light emitting device or turning on the light emitting device at a luminance value smaller than the preset luminance value in the sub-frames belonging to the second sub-frame group.

In addition, the dividing of the plurality of sub-frames into the first sub-frame group and the second sub-frame based on the light emission period may include: determining sub-frames belonging to the first sub-frame group such that a sum of periods of the sub-frames belonging to the first sub-frame group is shorter than or equal to the light emission period, and a difference between the sum of the periods of the sub-frames belonging to the first sub-frame group and the light emission period is shorter than or equal to a period of one of the plurality of sub-frames; and determining sub-frames not belonging to the first sub-frame group among the plurality of sub-frames as sub-frames belonging to the second sub-frame group.

In addition, the turning off of the light emitting device or turning on the light emitting device at the luminance value smaller than the preset luminance value in the sub-frames belonging to the second sub-frame group may include, in response to the sum of the periods of the sub-frames belonging to the first sub-frame group being equal to the light emission period, turning off the light emitting device in all of the sub-frames belonging to the second sub-frame group.

In addition, the turning off of the light-emitting device or turning on of the light emitting device at the luminance value smaller than the preset luminance value in the sub-frames belonging to the second sub-frame group may include, in response to the sum of the periods of the sub-frames belonging to the first sub-frame group being shorter than the light emission period, turning on the light emitting device in at least one first sub-frame among the sub-frames belonging to the second sub-frame group at the luminance value smaller than the preset luminance and turning off the light emitting device in all remaining sub-frames other than the at least one first sub-frame among the sub-frames belonging to the second sub-frame group.

In addition, the turning on of the light emitting device in the at least one first sub-frame among the sub-frames belonging to the second sub-frame group at the luminance value smaller than the preset luminance value may include, based on the difference between the sum of the periods of the sub-frames belonging to the first sub-frame group and the light emission period, determining a number of the at least one first sub-frame and a luminance value of the at least one first sub-frame.

In addition, the dividing of the plurality of sub-frames into the first sub-frame group and the second sub-frame based on the light emission period may include, in response to the light emission period being shorter than a period of one of the plurality of sub-frames, determining all of the plurality of sub-frames to be the second sub-frame group, and the turning off of the light emitting device or turning on of the light emitting device at the luminance value smaller than the preset luminance value in the sub-frame belonging to the second sub-frame group may include: turning on the light emitting device in at least one first sub-frame among the sub-frames belonging to the second sub-frame group at the luminance value smaller than the preset luminance value and turning off the light emitting device in all remaining sub-frames other than the at least one first sub-frame among the sub-frames belonging to the second sub-frame group.

In addition, the turning on of the light emitting device in the at least one first sub-frame among the sub-frames belonging to the second sub-frame group at the luminance value smaller than the preset luminance value may include determining a number of the at least one first sub-frame and a luminance value of the at least one first sub-frame based on the gray level.

In addition, the dividing of the plurality of sub-frames into the first sub-frame group and the second sub-frame based on the light emission period may include: in response to a difference between the light emission period and a period of the unit frame being shorter than a period of one of the plurality of sub-frames, determining one sub-frame among the plurality of sub-frames to be the second sub-frame group, and the turning off of the light emitting device or turning on of the light emitting device at the luminance value smaller than the preset luminance value in the sub-frame belonging to the second sub-frame group may include turning on the light emitting device at a first luminance value smaller than the preset luminance value in the one sub-frame belonging to the second sub-frame group.

In addition, the turning on of the light emitting device at the first luminance value smaller than the preset luminance value in the sub-frame belonging to the second sub-frame group may include determining the first luminance value based on the difference between the light emission period and the period of the unit frame.

In addition, the preset luminance value may be a luminance value of the light emitting device when the gray level has the preset value.

According to an aspect of the disclosure, a magnitude of a driving current flowing through a light emitting device is fixed in a low luminance region, so that color coordinates of the light emitting device can be prevented.

In addition, according to an aspect of the disclosure, the uniformity of a screen of the display device in a low luminance region can be improved.

DETAILED DESCRIPTION

Figure 1:
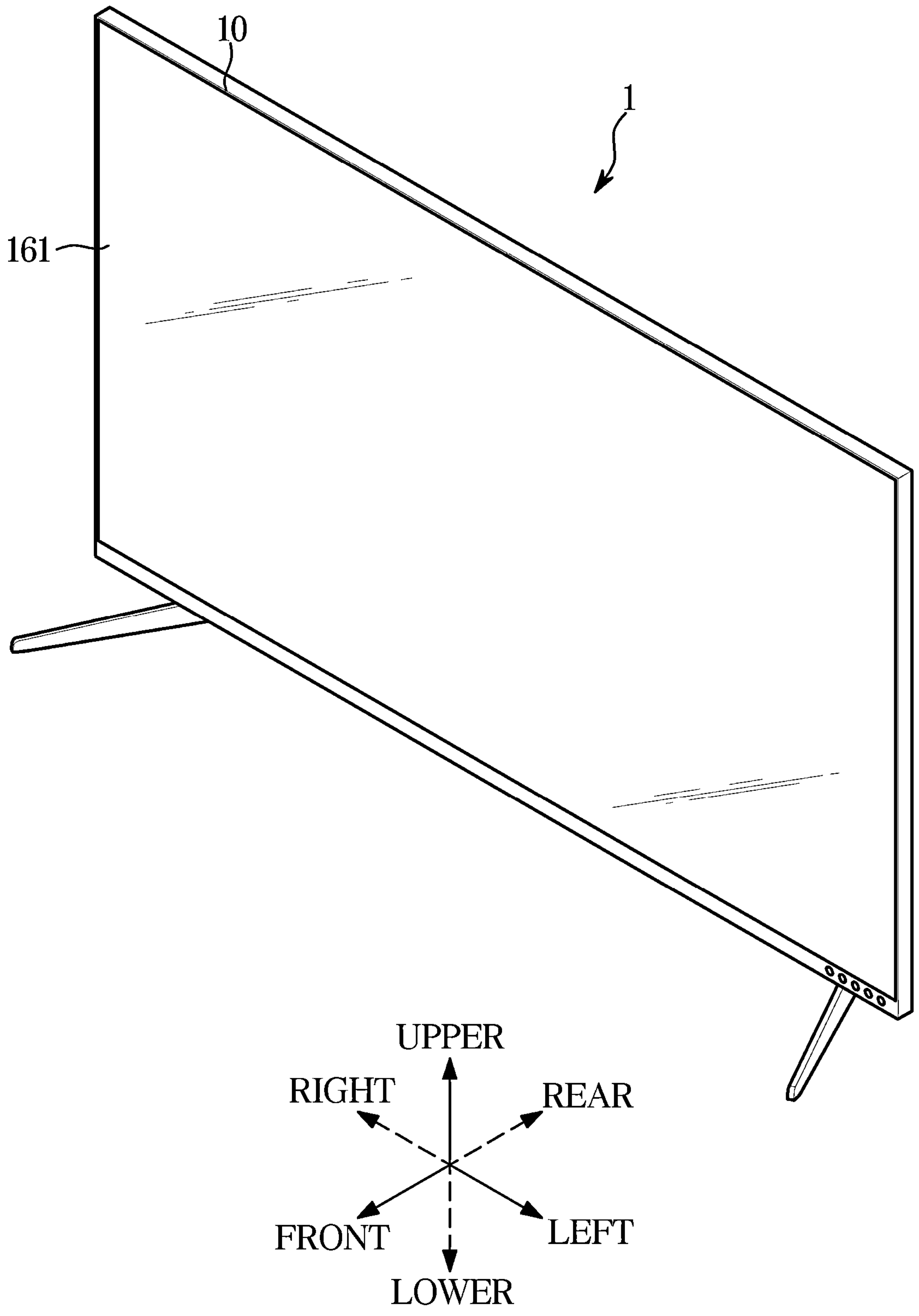
FIG. 1 illustrates an appearance of a display device according to an embodiment.

Like reference numerals denote like elements throughout the specification. In the specification, all elements of the embodiments are not described, and general contents in the art or repeated contents between the embodiments will not be described. Terms such as parts, modules, members, and blocks may be implemented using software or hardware, and a plurality of parts, modules, members, and blocks are implemented as a single element, or one part, module, member, or block may in addition include a plurality of elements.

Throughout the specification, when a part is referred to as being "connected" to another part, it includes "directly connected" to another part and "indirectly connected" to another part, and the "indirectly connected" to another part includes "connected" to another part through a wireless communication network, or electrically connected to another part through wiring, soldering, or the like.

In addition, when a part "includes" an element, another element may be further included, rather than excluding the existence of another element, unless otherwise described.

Throughout the specification, when a member is referred to as being "on" another member, the member is in contact with another member or yet another member is interposed between the two members.

Through the specification, the expression of an ordinal number such as "first" and "second" is used to distinguish a plurality of members, and the used ordinal number does not indicate an arrangement order, a manufacturing order, importance, and the like of the members.

The singular expression includes a plural expression unless there are obvious exceptions in the context.

In each step, an identification symbol is used to refer to each step, the identification symbol does not limit the order of each step, and each step may be performed in an order different from the described order unless the context clearly indicates a specific order.

Hereinafter, the working principle and embodiments of the disclosure will be described with reference to the accompanying drawings.

FIG. 1 illustrates a display device according to an embodiment.

A display device 1 is an apparatus for processing image data received from the outside and visually displaying the processed image data. In the following description, a case in which the display device 1 is a television (TV) is illustrated, but the disclosure is not limited thereto. For example, the display device 1 may be implemented in various forms, such as a monitor, a portable multimedia device, a portable communication device, a portable computing device, etc., and may not be limited as long as it can visually display an image.

In addition, the display device 1 may be a large format display (LFD) installed outdoors, such as on the roof of a building or at a bus stop. Here, the outdoors are not limited to an open-air place, and may include a place where a large number of people enter or exist, even inside of a building, such as subway stations, shopping malls, cinemas, companies, shops, and the like in which the display device 1 according to the embodiment may be installed.

The display device 1 may receive a video signal and an audio signal from various content sources, and may output video and audio corresponding to the video signal and the audio signal. For example, the display device 1 may receive television broadcast content through a broadcast reception antenna or a wired cable, receive content from a content reproduction device, or receive content from a content providing server of a content provider.

The display device 1 includes a main body 10 for forming the external appearance thereof and accommodates or supports various components constituting the display device 1, and a liquid crystal panel 161 for displaying an image.

Various components for displaying an image on the liquid crystal panel 161 may be provided inside the main body 10.

Figure 2:
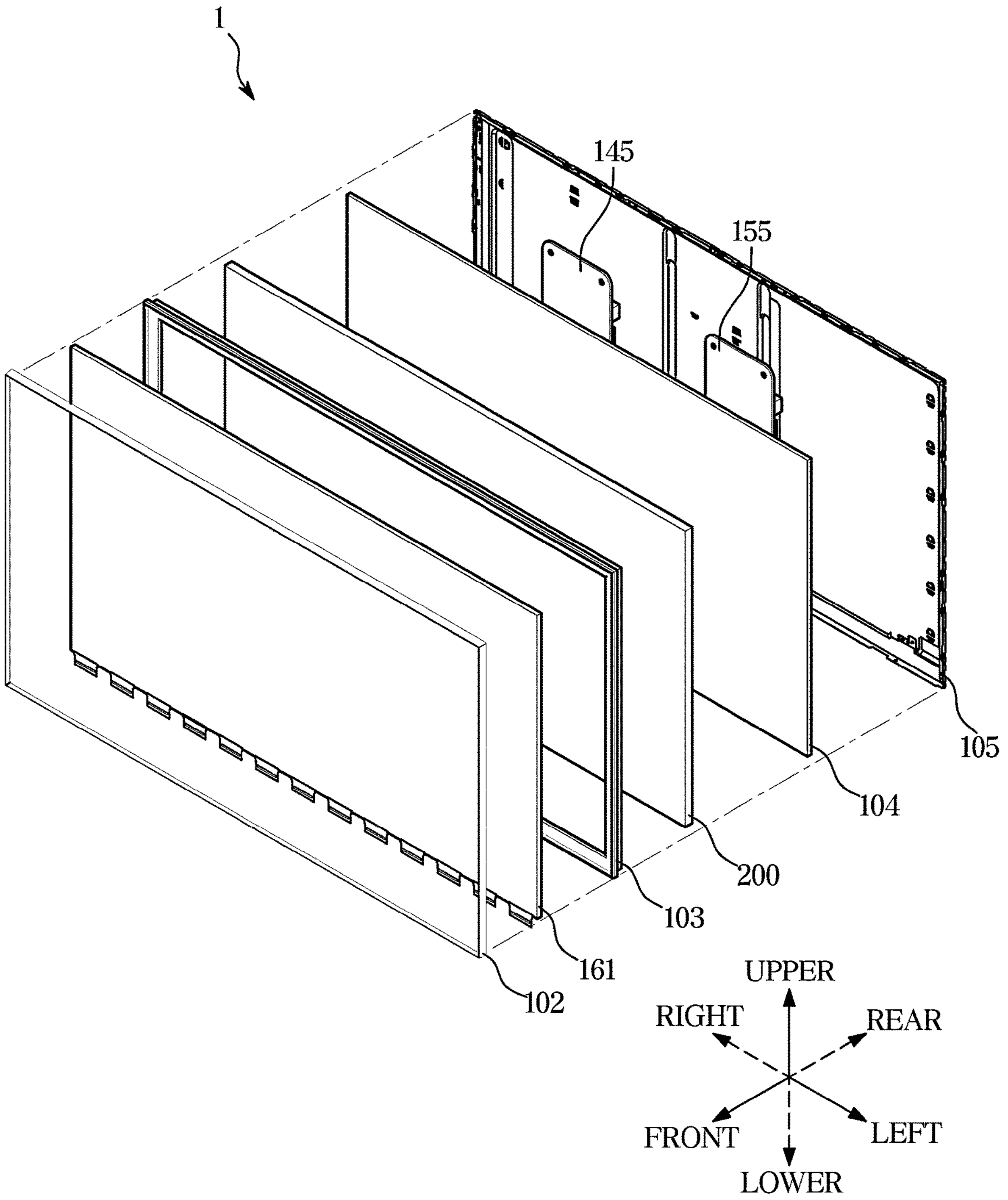
FIG. 2 is an exploded view illustrating a display device according to an embodiment.

For example, as shown in FIG. 2, the main body 10 may include a backlight unit 200 for emitting surface light forward, a liquid crystal panel 161 for blocking or passing light emitted from the backlight unit 200, a power assembly 145 for supplying power to the liquid crystal panel 161 and the backlight unit 200, and a control assembly 155 for controlling operations of the liquid crystal panel 161 and the backlight unit 200.

In addition, the main body 10 may include a bezel 102, a frame middle mold 103, a bottom chassis 104, and a rear cover 105. The bezel 102, the frame middle mold 103, the bottom chassis 104, and the rear cover 105 may support and fix the power assembly 145, the control assembly 155, the liquid crystal panel 161, and the backlight unit 200.

In general, the liquid crystal panel 161 may apply a grayscale voltage to a liquid crystal layer, which has liquid crystal material of constant anisotropic dielectric injected between substrates, so that the amount of light transmitted through the substrate is adjusted to thereby display image data.

Meanwhile, the liquid crystal panel 161 may include a plurality of pixels. Here, a pixel is a minimum unit constituting a screen displayed through the liquid crystal panel 161, and may also be referred to as a dot or a pixel. Hereinafter, for the sake of convenience of description, it will be described as a pixel.

Each pixel may receive an electrical signal representing image data and output an optical signal corresponding to the received electrical signal. As such, the optical signals output from the plurality of pixels included in the liquid crystal panel 161 may be combined to display image data on the liquid crystal panel 161.

In this case, each pixel is provided with a pixel electrode, and connected to a gate line and a scan line. The gate line and the scan line may be configured by a method known to those skilled in the art, and detailed descriptions thereof will be omitted.

In addition, since the liquid crystal panel 161 may not emit light by itself, the display device 1 may be provided with the backlight unit 200 for projecting backlight to the liquid crystal panel 161 as described above.

Accordingly, the display device 1 may adjust the intensity of a grayscale voltage applied to the liquid crystal layer of the liquid crystal panel 161 so that the transmittance of the backlight passing through the liquid crystal layer is adjusted, to thereby display desired image data.

The backlight unit 200 may be implemented as a direct type backlight unit or an edge type backlight unit, and may also be implemented in various types known to those skilled in the art. Hereinafter, the backlight unit 200 provided as a direct type backlight unit will be described as an example. However, the embodiment of the disclosure is not limited to the above example, and the backlight unit 200 may be implemented in various known forms.

Figure 3:
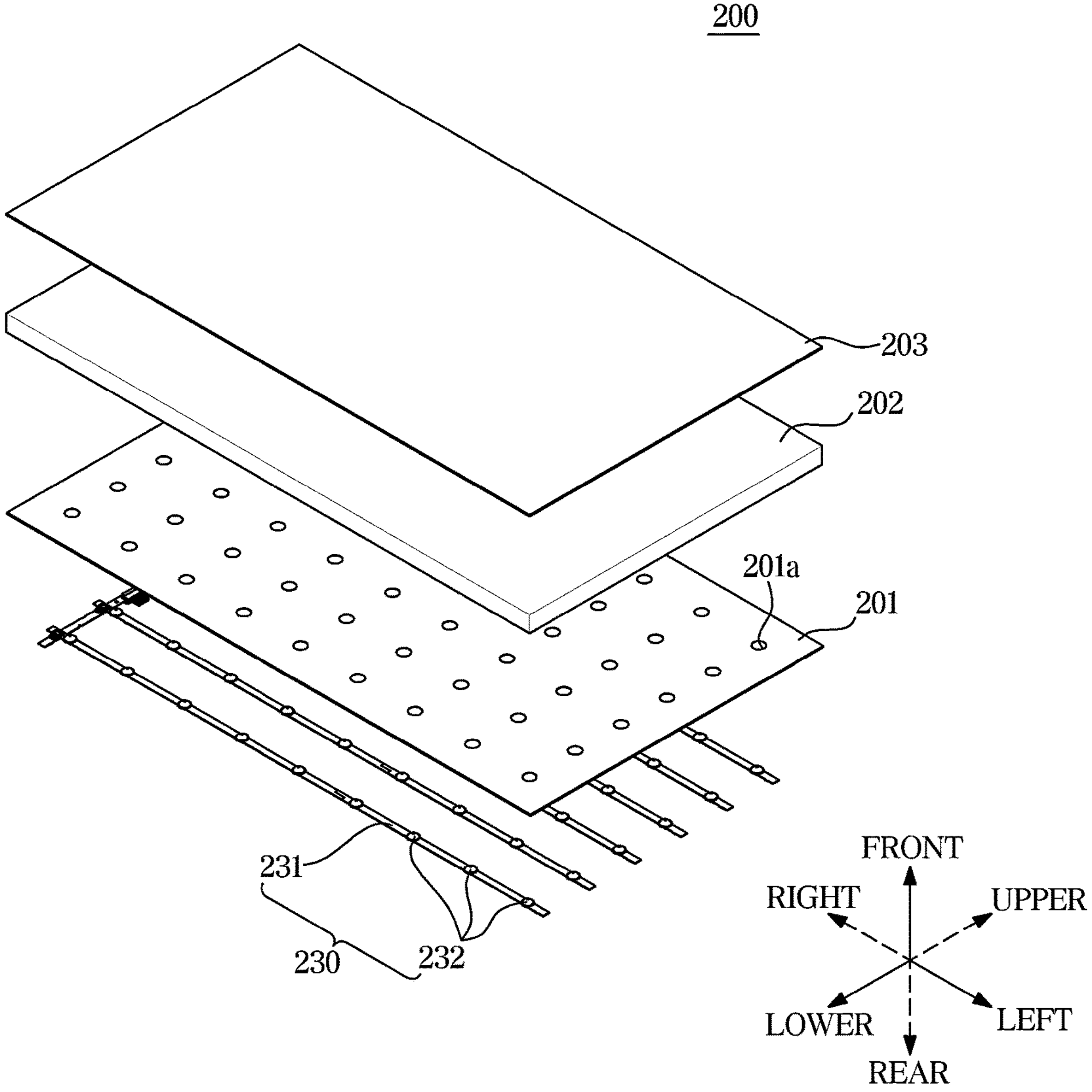
FIG. 3 is an exploded view illustrating a backlight unit according to an embodiment.

As shown in FIG. 3, the backlight unit 200 may include a light emitting device array 230 for generating light, a reflective sheet 201 for reflecting light, a diffuser plate 202 for dispersing light, and an optical sheet 203 for improving luminance.

The light emitting device array 230 may be provided at the rearmost side of the backlight unit 200 and may include a plurality of light emitting devices 232. In addition, each of the plurality of light emitting devices 232 may include a separate driving circuit for driving the plurality of light emitting devices 232. The plurality of light emitting devices 232 may be disposed in parallel to each other to face the liquid crystal panel 161, and may emit light toward the front.

In addition, the light emitting device array 230 may include a plurality of supports 231 for supporting and fixing the plurality of light emitting devices 232.

The plurality of light emitting devices 232 may be mounted in a predetermined arrangement to have a uniform luminance. For example, the plurality of light emitting devices 232 may be mounted on the plurality of supports 231 at equal intervals. The form in which the plurality of light emitting devices 232 are disposed on the plurality of supports 231 may vary.

In this case, the plurality of supports 231 may supply power to the plurality of light emitting devices 232. That is, each of the plurality of light emitting devices 232 may be supplied with current and supplied with power through corresponding one of the plurality of supports 231. The plurality of supports 231 may include of a synthetic resin including a conductive power supply line for supplying power to the plurality of light emitting devices 232 or a printed circuit board (PCB).

Each of the plurality of light emitting devices 232 may be one of a light emitting diode (LED), an organic light emitting diode (OLED), and a quantum dot organic light emitting diode (QD-OLED) capable of self-emitting light based on a supplied current. However, the type of the light emitting device is not limited thereto, and the light emitting device may be provided without limitation as long as it can emit light according to a current.

The plurality of light emitting devices 232 may emit light of different intensities according to the magnitude of the current supplied thereto. The plurality of light emitting devices 232 may emit light of a stronger intensity as the supplied driving current increases.

When the display device 1 according to an embodiment is an LCD-type display device, the light emitting device provided in the backlight unit may be a white LED emitting white light, and when the display device 1 according to an embodiment is a QLED-type display device including a quantum dot sheet (QD sheet), the light emitting device provided in the backlight unit may be a blue LED emitting blue light.

The reflective sheet 201 may be provided in front of the light emitting device array 230, and may allow light traveling to the rear side of the backlight unit 200 to be reflected forward.

The reflective sheet 201 may include a plurality of through holes 201*a* formed at a position corresponding to the plurality of light emitting devices 232. In addition, plurality of light emitting devices 232 may be protruded forward of the reflective sheet 201 through the plurality of through holes 201*a*. Since the plurality of light emitting devices 232 emit light in various directions from the front of the reflective sheet 201, some of the light emitted from the plurality of light emitting devices 232 may travel backward. A reflective film included in the reflective sheet 201 may allow light emitted from the plurality of light emitting devices 232 rearward to be reflected to the front.

The diffuser plate 202 may be provided in front of the light emitting device array 230 and the reflective sheet 201, and may evenly distribute the light emitted from the plurality of light emitting devices 232 of the light emitting device array 230.

The plurality of light emitting devices 232 are located in a plurality of places on a rear surface of the backlight unit 200. Even when the plurality of light emitting devices 232 are disposed at equal intervals on the rear surface of the backlight unit 200, luminance non-uniformity may occur depending on the positions of the plurality of light emitting devices 232. The diffuser plate 202 may diffuse light emitted from the light emitting device inside the diffuser plate 202 to remove non-uniformity of luminance caused by the light emitting device. In this way, the diffuser plate 202 may allow light incident from the light emitting device array 230 to be uniformly emitted to the front.

The diffuser plate 202 may be formed of poly methyl methacrylate (PMMA) or polycarbonate (PC) to which a diffusion agent for light diffusion is added.

The optical sheet 203 may include various sheets for improving luminance and uniformity of luminance. For example, the optical sheet 203 may include a diffusion sheet, a first prism sheet, a second prism sheet, and a reflective polarizing sheet.

In addition, the backlight unit 200 may further include a quantum dot film (not shown) capable of converting the color of the light emitted from the plurality of light emitting devices 232, according to embodiments. In this case, the quantum dot film may be provided between the diffuser plate 202 and the optical sheet 203. In addition, the backlight unit 200 may include various sheets according to embodiments.

In the above, on the assumption that the display device 1 according to the embodiment is an LCD-type display device or a QLED-type display device, physical configuration of the display device 1 has been described.

However, the display device 1 according to an embodiment may be an OLED-type display device, and when the display device 1 is an OLED-type display device, the liquid crystal panel 161 may be omitted.

That is, when the display device 1 is an OLED display device, each of the plurality of light emitting devices 232 provided in the backlight unit 200 may include a red light emitting device, a green light emitting device, and a blue light emitting device, and an image may be formed by a combination of red light emitted from the red light emitting device, green light emitted from the green light emitting device, and blue light emitted from the blue light emitting device.

Figure 4:
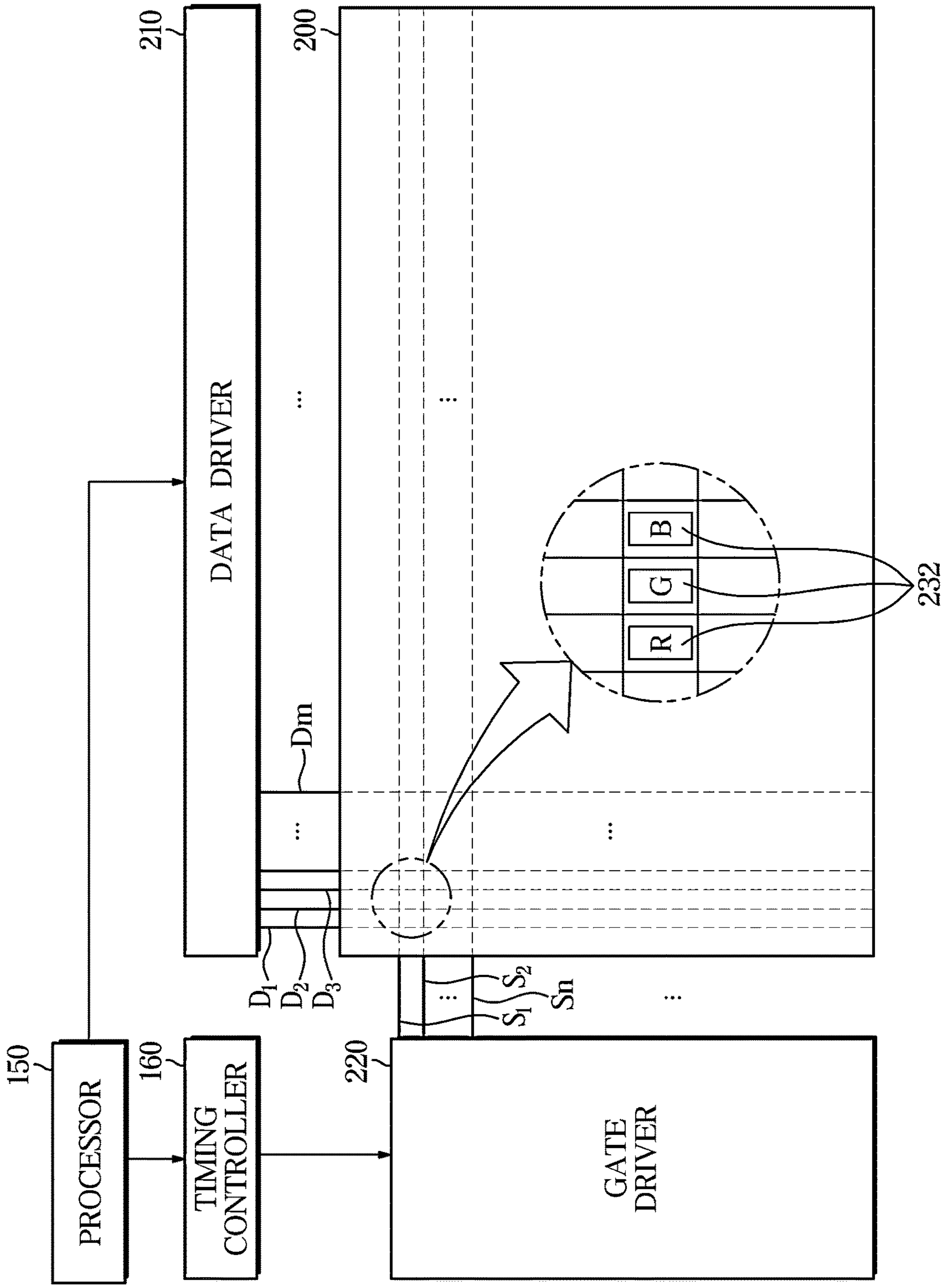
FIG. 4 is a control block diagram illustrating a display device according to an embodiment.

FIG. 4 is a control block diagram illustrating a display device according to an embodiment.

Referring to FIG. 4, the display device 1 according to the embodiment may include a plurality of scan lines S1, S2 . . . and Sn for transmitting scan signals to scan transistors TS connected to the respective light emitting devices and a plurality of data lines D1, D2, D3 . . . and Dm formed to cross the plurality of scan lines S1, S2 . . . and Sn and transmitting data voltages to the respective one of the plurality of light emitting devices 232.

In addition, the display device 1 may include a processor 150 that controls the plurality of light emitting devices 232 based on image data input from the outside, a timing controller 160 that divides a unit frame of image data into a plurality of sub-frames each having the same period and generates a scan signal corresponding to each of the sub-frames, a gate driver 220 that supplies scan signals to the plurality of scan lines S1, S2 . . . and Sn based on the control of the timing controller 160, and a data driver 210 that supplies data signals to the plurality of data lines D1, D2, D3 . . . and Dm based on the control of the processor 150.

The processor 150 may be provided as a single integrated chip (IC) with the timing controller 160 or a separate IC from the timing controller 160, and included in the control assembly 155.

The processor 150 and/or the timing controller 160 may determine a gray level required for each of the plurality of light emitting devices 232 per unit frame based on image data input from the outside, and may control the data driver 210 and the gate driver 220 based on the gray level.

The gate driver 220 according to the embodiment may be connected to one end or both ends of the scan lines S1, S2 . . . and Sn, and may apply a pulse voltage to the scan lines S1, S2 . . . and Sn arranged on the light emitting device array 230 based on the scan signal provided from the processor 150 and/or the timing controller 160.

The gate driver 220 may include at least one gate drive IC, and the gate drive IC may be determined according to standards, such as the size and resolution of the light emitting device array 230.

That is, the gate drive IC of the gate driver 220 may receive the scan signal and sequentially apply on/off voltages, that is, on/off signals through the scan lines S1, S2 . . . and Sn. Accordingly, the gate drive IC may sequentially turn on/off the scan transistors TS connected to the scan lines S1, S2 . . . and Sn.

The data driver 210 according to the embodiment may set an output timing of the data voltage, the magnitude and polarity of the data voltage, etc. based on a control signal input from the processor 150 and/or the timing controller 160, and may output an appropriate data voltage through the data lines D1, D2, D3 . . . and Dm according to a supply timing.

That is, the data driver 210 may, under the control of the processor 150, supply each of the plurality of light emitting devices 232 with a data voltage corresponding to a gray level required for each of the the plurality of light emitting devices 232 through the data lines D1, D2, D3 . . . and Dm.

In other words, the data driver 210 may convert luminance data (a gray level) corresponding to image data received from the processor 150 into a data voltage in the form of analog and/or digital form and apply the data voltage to each of the data lines D1, D2, D3 . . . and Dm arranged on the light emitting device array 230.

The data driver 210 may include at least one data drive IC, and the number of the data drive ICs may be determined according to standards, such as the size and resolution of the light emitting device array 230.

Each of the plurality of light emitting devices 232 provided in the light emitting device array 230 may be turned on at a specific luminance value or turned off based on the control of the processor 150 and/or the timing controller 160.

In FIG. 4, an example in which each of the plurality of light emitting devices 232 includes a red light emitting device, a green light emitting device, and a blue light emitting device is illustrated, but each of the plurality of light emitting devices 232 may include a white light emitting device and/or a blue light emitting device.

Hereinafter, a driving circuit connected to one data line DL and one scan line SL to drive one of the plurality of light emitting devices 232 will be described in detail.

Figure 5:
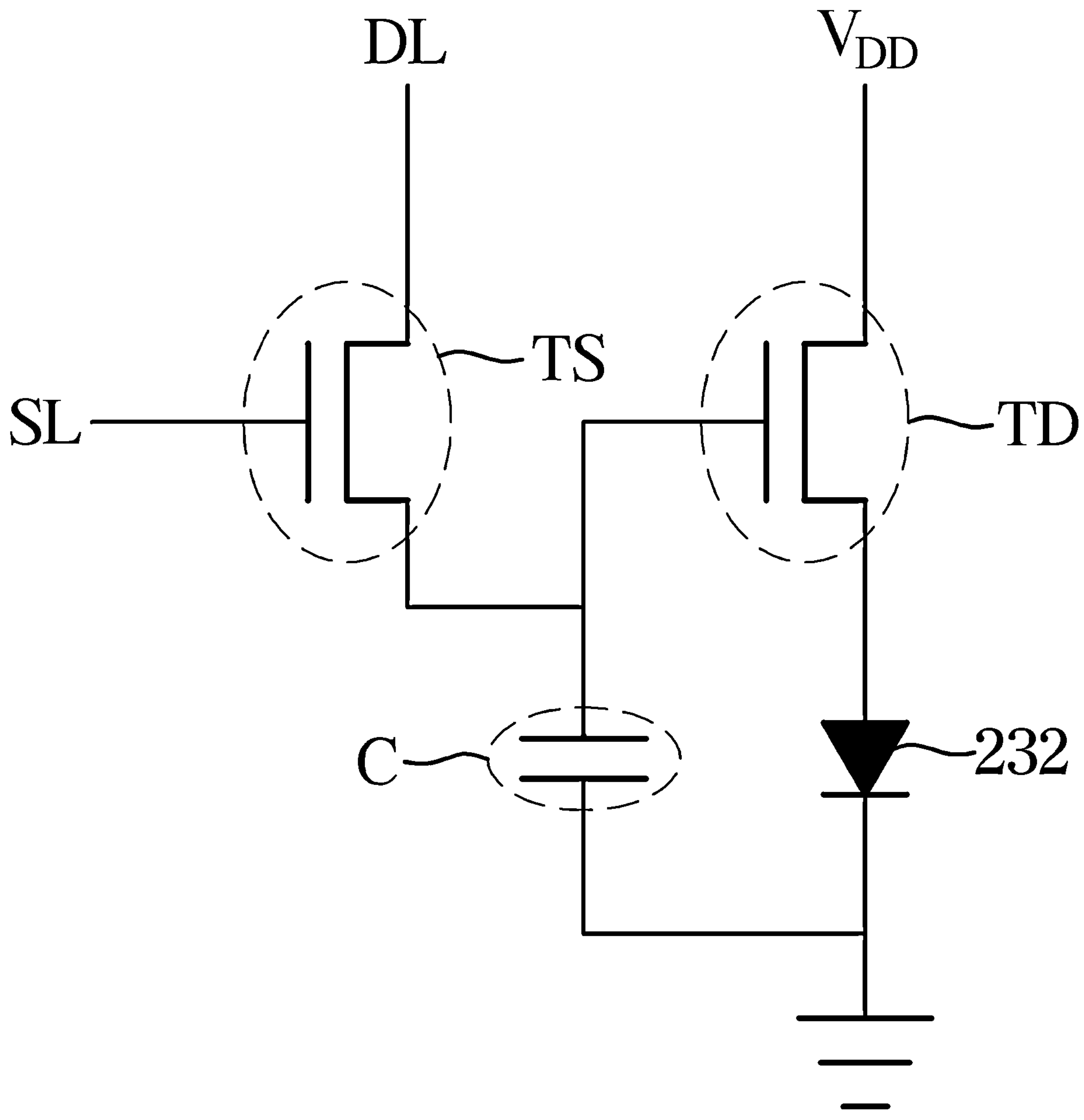
FIG. 5 is a diagram illustrating a configuration of a driving circuit of a light emitting device according to an embodiment.

FIG. 5 is a diagram illustrating a configuration of a driving circuit of a light emitting device according to an embodiment.

Referring to FIG. 5, the driving circuit of the light emitting device may include a scan transistor TS, a driving transistor TD, a capacitor C, and one of the plurality of light emitting devices 232.

The scan transistor TS may have a gate connected to the scan line SL to receive a scan signal as a gate voltage so as to be turned on/off, and have a source connected to the data line DL to transfer a charge amount corresponding to a data voltage a capacitor C.

The capacitor C may supply a gate voltage to a gate of the driving transistor TD based on the charged amount of charge, and the driving transistor TD may apply a driving current to one of the plurality of light emitting devices 232 based on the difference between the gate voltage and the source voltage.

The driving circuit of one of the plurality of light emitting devices 232 is not limited to the circuit shown in FIG. 5, and any type of driving circuit capable of driving the one of the plurality of light emitting devices 232 may be employed. However, for the sake of convenience of description, a method of controlling the display device 1 will be described based on the circuit described in FIG. 5.

In the above, various components and internal circuit configurations of the display device 1 have been described.

Hereinafter, a method of controlling the display device using various components of the display device 1 will be described in detail.

Figure 6:
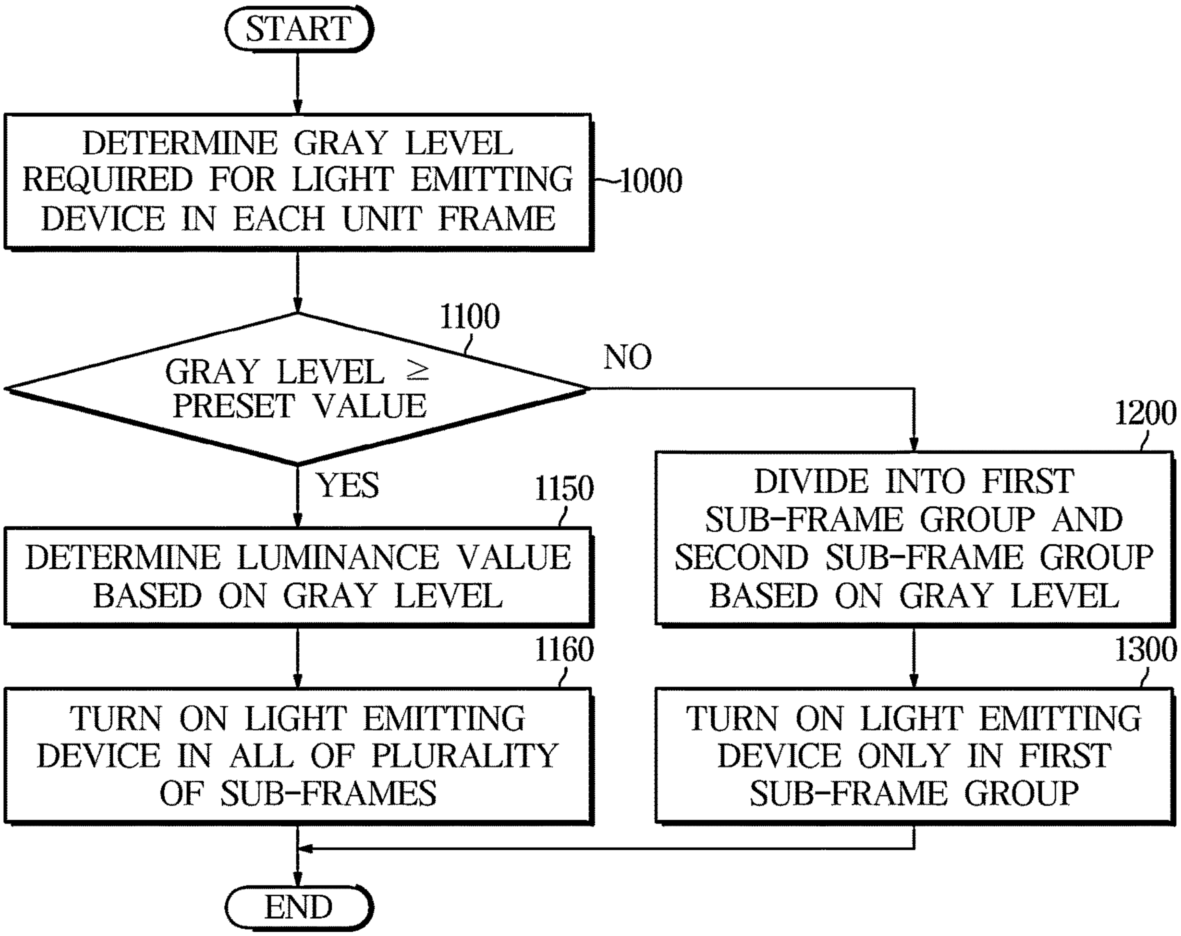
FIG. 6 is a flowchart showing a method of controlling a display device according to an embodiment.
Figure 7:
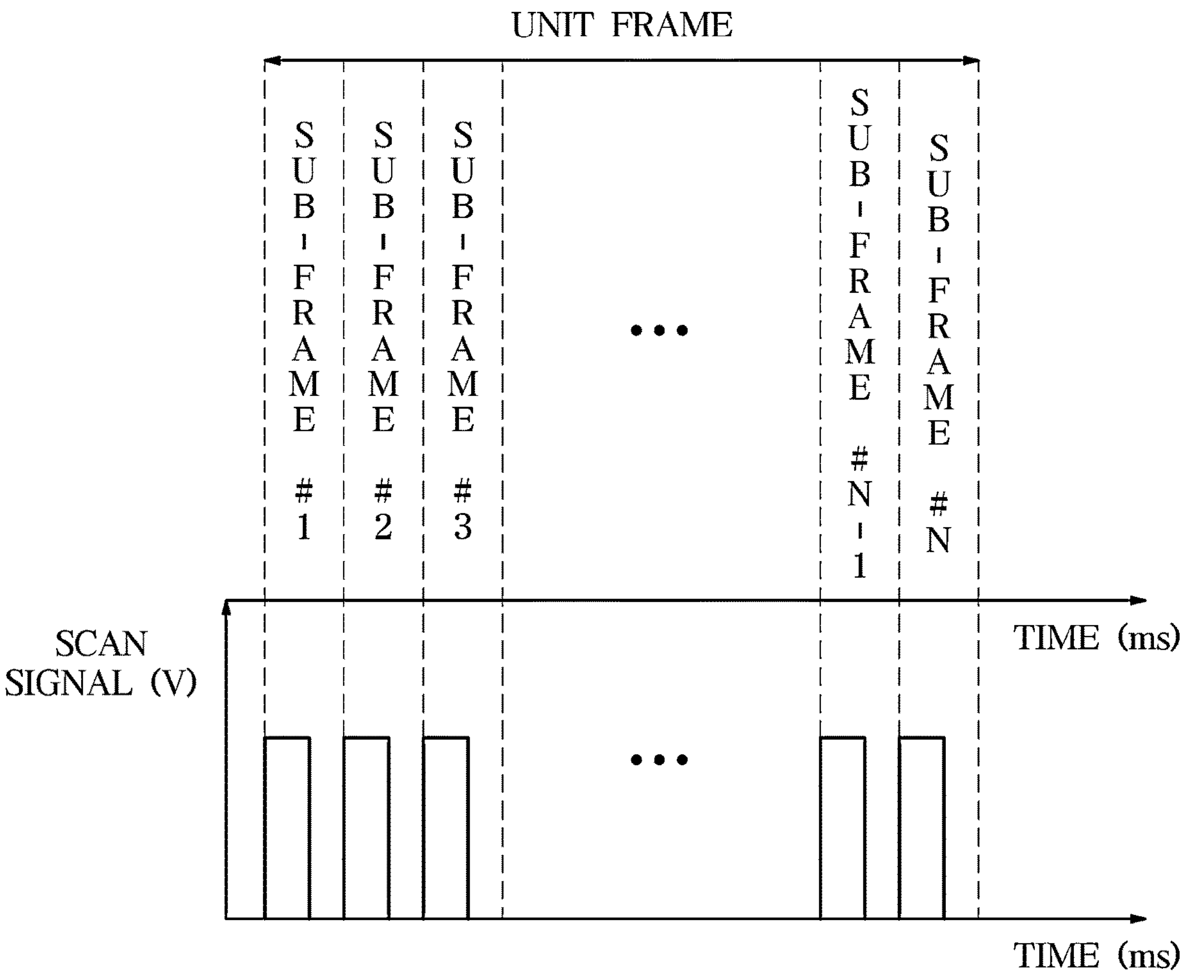
FIG. 7 is a diagram for describing a scan signal generation timing of a timing controller according to an embodiment.
Figure 8:
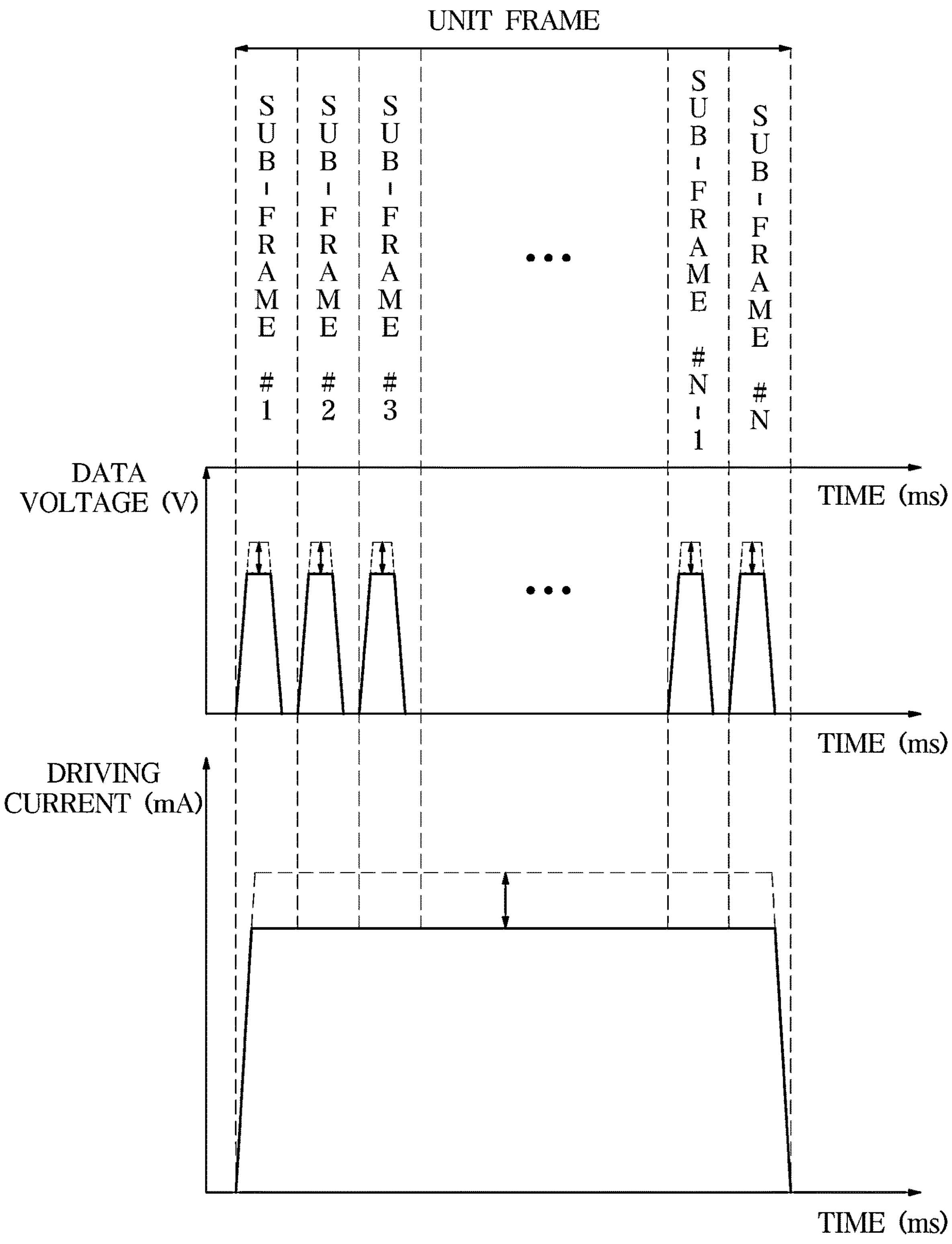
FIG. 8 is a diagram illustrating a driving current applied to a light emitting device in a high luminance region according to an embodiment.
Figure 9:
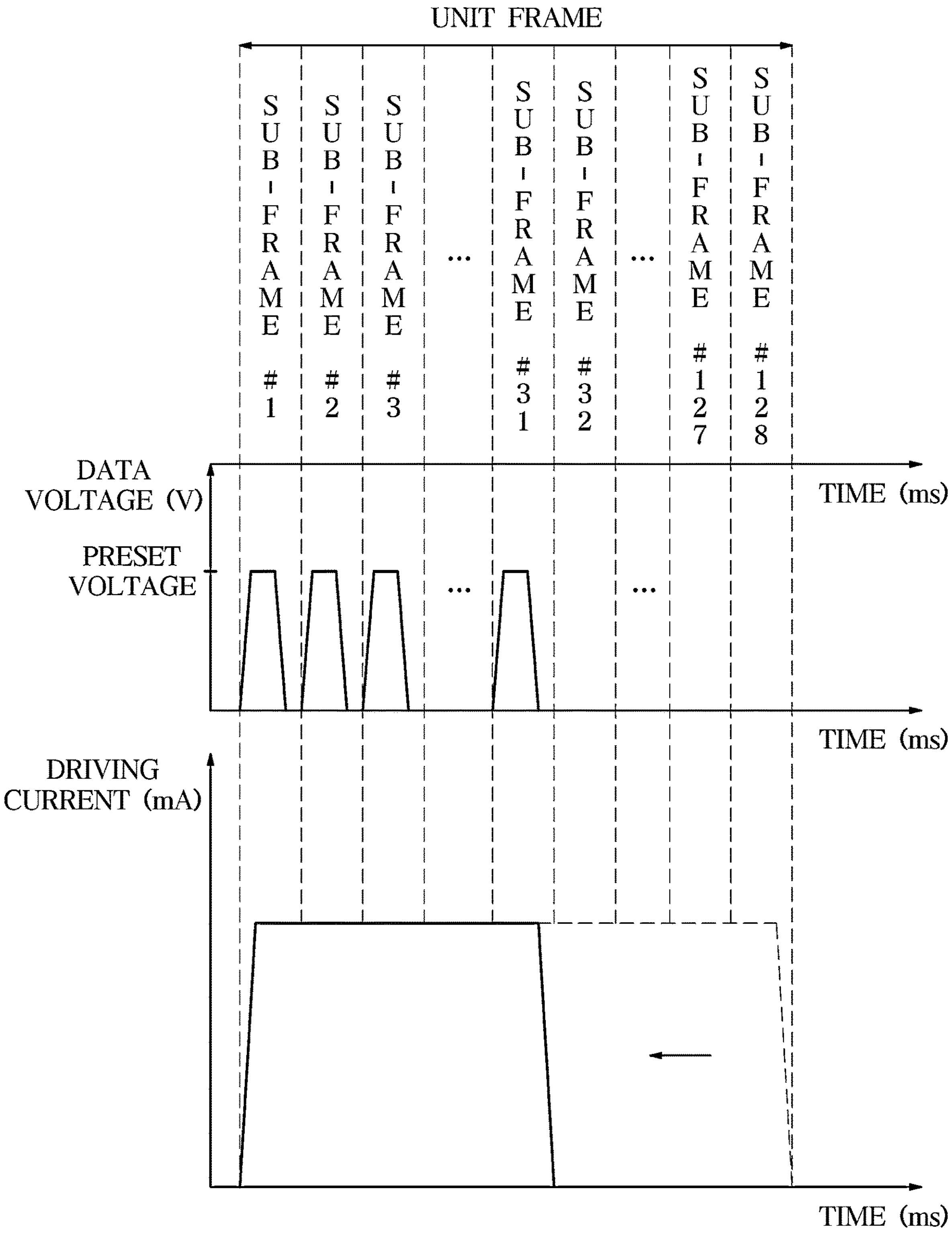
FIGS. 9 to 11 are diagrams illustrating a driving current applied to a light emitting device in a low luminance region according to an embodiment.
Figure 10:
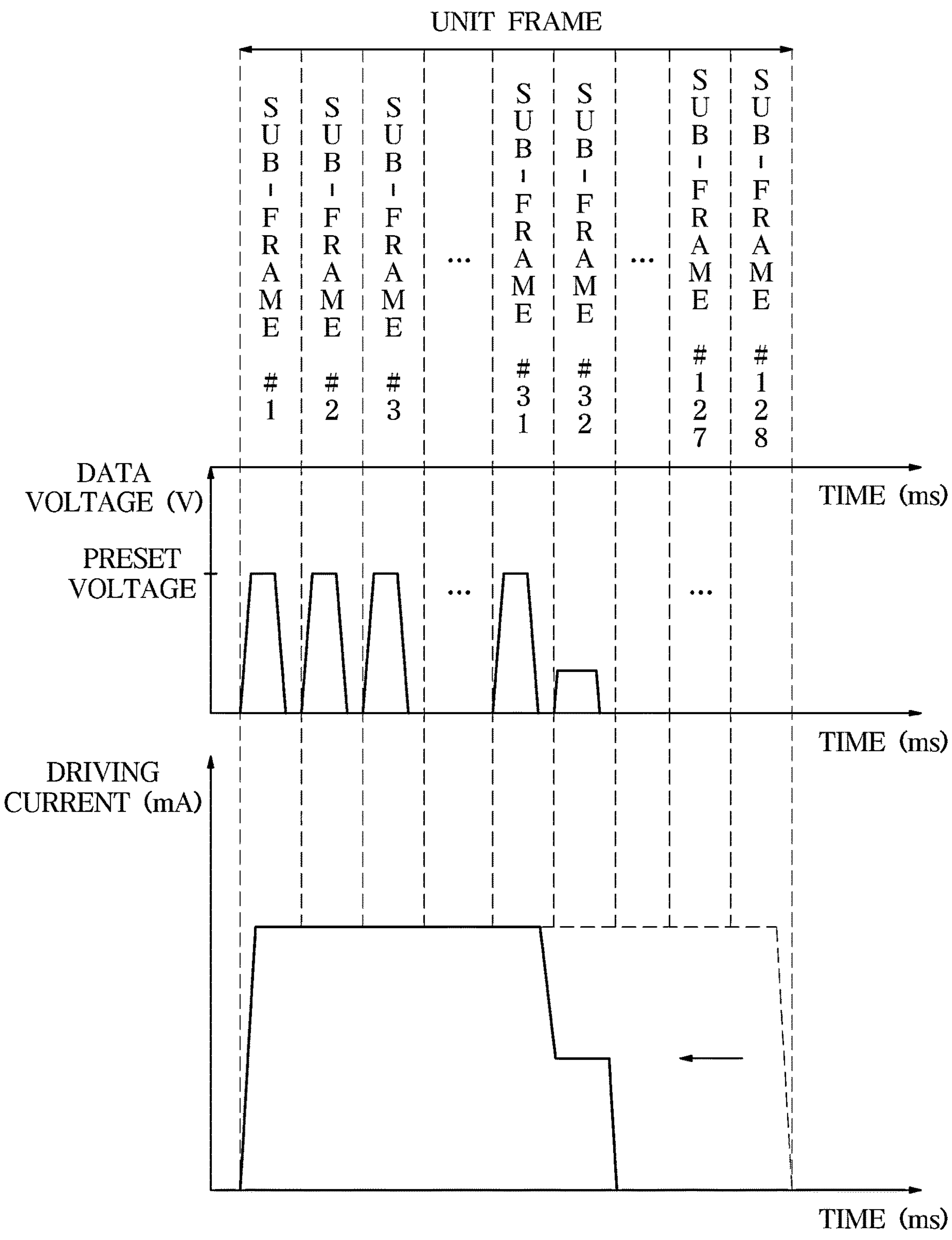
Figure 11:
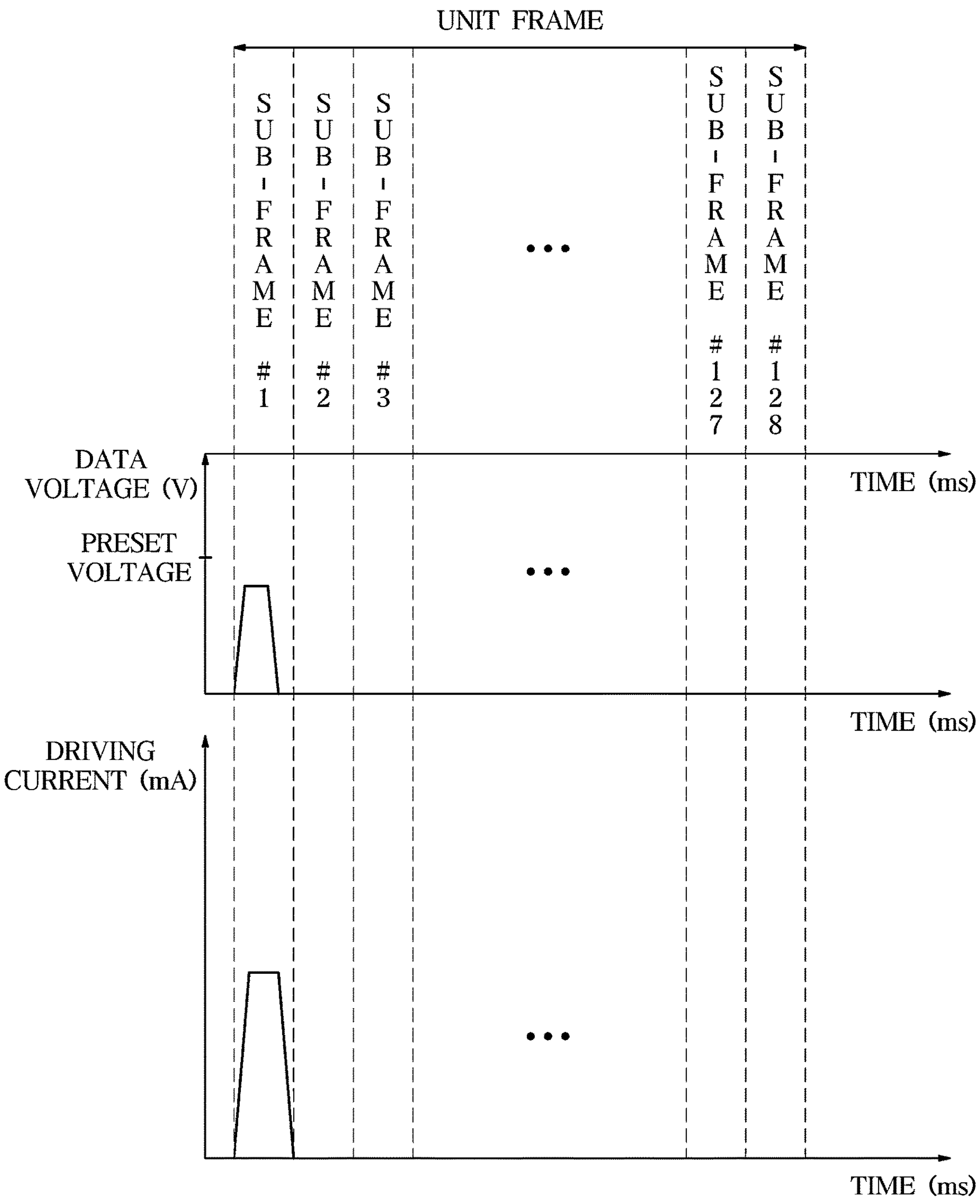

FIG. 6 is a flowchart showing a method of controlling a display device according to an embodiment, FIG. 7 is a diagram for describing a scan signal generation timing of a timing controller according to an embodiment, FIG. 8 is a diagram illustrating a driving current applied to a light emitting device in a high luminance region according to an embodiment, and FIGS. 9 to 11 are diagrams illustrating a driving current applied to a light emitting device in a low luminance region according to an embodiment Referring to FIG. 6, the processor 150 may determine a gray level required for each of the plurality of light emitting devices 232 in each unit frame based on image data (1000).

When image data allocates 11 bits of data to each pixel of a unit frame, the gray level required for each of the plurality of light emitting devices 232 in each unit frame may be determined in the range of 0 to 2047.

The timing controller 160 may divide a unit frame into a plurality of sub-frames and generate a scan signal corresponding to each sub-frame. In this case, each of the plurality of sub-frames may have the same period.

Referring to FIG. 7, the timing controller 160 may divide a unit frame into N sub-frames and generate a scan signal corresponding to each sub-frame.

Assuming that each of the plurality of sub-frames has the same period and the period of the unit frame is 8.3 ms, the period of one sub-frame may correspond to a value obtained by dividing 8.3 ms by N.

In addition, the timing controller 160 may determine the number of sub-frames based on the number of bits of the image data, and may divide the unit frame into the determined number of sub-frames.

For example, when image data allocates 11 bits of data to each pixel of a unit frame, the timing controller 160 may divide the unit frame into 128 sub-frames and generate scan signals corresponding to the 128 sub-frames. However, the disclosure is not limited thereto.

Thereafter, the processor 150 may determine whether the gray level required for each of the plurality of light emitting devices 232 is greater than or equal to a preset value (1100).

The preset value may be set in advance as a gray level value serving as a criterion for dividing low luminance/high luminance regions, and may be stored in a memory (not shown).

For example, the processor 150 may determine whether the gray level required for each of the plurality of light emitting devices 232 is greater than or equal to 1024.

In response to the gray level being greater than or equal to the preset value (YES in operation 1100), the processor 150 may determine the luminance value of each of the plurality of light emitting devices 232 based on the gray level (1150), and turn on each of the plurality of light emitting devices 232 at the determined luminance value in all of the plurality of sub-frames (1160).

Specifically, referring to FIG. 8, the processor 150 may control the driving current flowing through each of the plurality of light emitting devices 232 by adjusting the amplitude of the data voltage applied to the data line DL during the period in which the scan transistor TS is turned on, in all of the plurality of sub-frames.

That is, the processor 150 may determine the magnitude of the data voltage applied to the data line based on the gray level required for each of the plurality of light emitting devices 232, and apply a data voltage through the data line DL in a period in which the scan transistor TS is turned on in all of the plurality of sub-frames, to control the driving current flowing through each of the plurality of light emitting devices 232 so that each the plurality of light emitting devices 232 may be turned on at the determined luminance value.

In conclusion, the processor 150 may, in response to or based on the gray level required for one of the plurality of light emitting devices 232 being greater than or equal to the preset value, control the amplitude of the driving current flowing through the one of the plurality of light emitting devices 232, to control the luminance of the one of the plurality of light emitting devices 232.

For example, when the preset value is 1024 (10000000000) and the gray level required for the one of the plurality of light emitting devices 232 is 1523 (10111110011), the processor 150 may control the data driver 210 to output a data voltage (e.g., 4V) corresponding to 499 (0111110011), which is the lower 10 bits, in all of the plurality of sub-frames.

The processor 150 may, in response to or based on the gray level required for the one of the plurality of light emitting devices 232 being smaller than the preset value (NO in operation 1100), divide the plurality of sub-frames into a first sub-frame group and a second sub-frame group based on the gray level (1200).

Thereafter, the processor 150 may turn on the one of the plurality of light emitting devices 232 at a preset luminance value in sub-frames belonging to the first sub-frame group, and may turn off the one of the plurality of light emitting devices 232 or turn on the one of the plurality of light emitting devices 232 at a luminance value smaller than the preset luminance value in sub-frames belonging to the second sub-frame group (1300).

Specifically, the processor 150 may determine a light emission period, for which the one of the plurality of light emitting devices 232 needs to emit light to output a luminance corresponding to a required gray level, based on the gray level, and determine the number of sub-frames, in which a data voltage needs to be output, based on the light emission period of the one of the plurality of light emitting devices 232.

To this end, the processor 150 may determine sub-frames belonging to the first sub-frame group such that the sum of periods of the sub-frames belonging to the first sub-frame group is shorter than or equal to the light emission period of the one of the plurality of light emitting devices 232, and the difference between the sum of the periods of the sub-frames belonging to the first sub-frame group and the light emission period of the light emitting device is shorter than or equal to a period of one of the plurality of sub-frames, and may determine a sub-frame not belonging to the first sub-frame group among the plurality of sub-frames as a sub-frame belonging to the second sub-frame group.

The processor 150 may, in response to or based on the sum of the periods of the sub-frames belonging to the first sub-frame group being equal to the light emission period, turn off the one of the plurality of light emitting devices 232 in all of the sub-frames belonging to the second sub-frame group.

In addition, the processor 150 may, in response to or based on the sum of the periods of the sub-frames belonging to the first sub-frame group being shorter than the light emission period, turn on the one of the plurality of light emitting devices 232 in at least one first sub-frame among the sub-frames belonging to the second sub-frame group at the luminance value smaller than the preset luminance value and turn off the one of the plurality of light emitting devices 232 in all remaining sub-frames other than the at least one first sub-frame among the sub-frames belonging to the second sub-frame group. In this case, the processor 150 may determine the number of the at least one first sub-frame and a luminance value of the at least one first sub-frame based on the difference between the sum of the periods of the sub-frames belonging to the first sub-frame group and the light emission period.

The preset luminance value may refer to a luminance value of the one of the plurality of light emitting devices 232 when the gray level is the preset value.

For example, when the preset value is 1024 (10000000000), a luminance value of the one of the plurality of light emitting devices 232 according to a data voltage (e.g., 2V) corresponding to 0 (0000000000), which is the lower 10-bits, may be set to the preset luminance value.

Referring to FIG. 9, when the number of the plurality of sub-frames is 128 and the gray level required for the one of the plurality of light emitting devices 232 is 248 (00011111000), the processor 150 may determine the light emission period as a period corresponding to 31, based on 31 (00011111), which is the upper 8 bits, and 0 (000), which is the lower 3 bits. In this case, the processor 150 may determine thirty one sub-frames (sub-frames #1, #2, #3, . . . and #31) among the 128 frames as the first sub-frame group, and determine the remaining ninety seven sub-frames (sub-frames #32, #33, #34, . . . and #128) as the second sub-frame group.

In this case, since the sum of the periods of the thirty one sub-frames (sub-frames #1, #2, #3, . . . and #31) belonging to the first sub-frame group is the same as the light emission period corresponding to 31, the processor 150 may output a data voltage having a preset amplitude in all of the thirty one sub-frames (sub-frames #1, #2, #3, . . . and #31) belonging to the first sub-frame group to turn on the one of the plurality of light emitting devices 232 at the preset luminance value, and turn off the one of the plurality of light emitting devices 232 in all of the ninety seven sub-frames (sub-frames #32, #33, #34, . . . and #128) belonging to the second sub-frame group.

Referring to FIG. 10, when the number of the plurality of sub-frames is 128 and the gray level required for the one of the plurality of light emitting devices 232 is 250 (00011111010), the processor 150 may determine the light emission period as a period corresponding to ($31+\frac{2}{8}=31.25$) based on 31 (00011111), which is the upper 8 bits, and 2 (010), which is the lower 3 bits. In this case, the processor 150 may determine thirty one sub-frames (sub-frames #1, #2, #3, . . . and #31) among the 128 frames as the first sub-frame group, and determine the remaining ninety seven sub-frames (sub-frames #32, #33, #34, . . . and #128) as the second sub-frame group.

In this case, the sum of the periods of the thirty one sub-frames (sub-frames #1, #2, #3 . . . and #31) belonging to the first sub-frame group is shorter than the light emission period corresponding to 31.25. Accordingly, the processor 150 may turn on the light emitting device at the preset luminance value in all of the thirty one sub-frames (sub-frames #1, #2, #3 . . . and #31) belonging to the first sub-frame group, and turn on the one of the plurality of light emitting devices 232 at a luminance value smaller than the preset luminance value in at least one sub-frame (a sub-frame #32) of the second sub-frame group (sub-frames #32, #33, #34, . . . and #128) and turn off the one of the plurality of light emitting devices 232 in all of the remaining sub-frames (sub-frames #33, #34, . . . and #128).

In FIG. 10, an example in which the one of the plurality of light emitting devices 232 is turned on at a luminance value smaller than the preset luminance value in a first sub-frame (sub-frame #32), which is one of sub-frames (sub-frames #32, #33, #34, . . . and #128) in the second sub-frame group is illustrated, but the processor may turn on the one of the plurality of light emitting devices 232 at a luminance value smaller than the preset luminance value in a plurality of first sub-frames (sub-frames #33 and #35) among the sub-frames (sub-frames #32, #33, #34, . . . and #128) in the second sub-frame group.

In this case, the processor 150 may determine the number of at least one first sub-frame and a luminance value of the at least one first sub-frame based on 2 (010) which is the lower 3 bits. For example, when the processor 150 determines the number of the first sub-frame to one, the magnitude of the data voltage output in the sub-frame #32, which is determined as the first sub-frame, may be determined to be $\frac{2}{8}$ of the magnitude of the data voltage output in the sub-frames (sub-frames #1, #2, #3 . . . and #31) of the first sub-frame group.

As another example, when the processor 150 determines the number of first sub-frames to two, the magnitude of the data voltage output in sub-frames #33 and #35, which are arbitrarily determined as the first sub-frames, may be determined to be $\frac{1}{8}$ of the magnitude of the data voltage output in the sub-frames (sub-frames #1, #2, #3 . . . and #31) of the first sub-frame group.

The processor 150 may, in response to or based on the difference between the light emission period and the period of the unit frame being shorter than the period of one of the plurality of sub-frames, determine one of the plurality of sub-frames (sub-frames #1, #2, #3, . . . and #128) to be the second sub-frame group, and may turn on the one of the plurality of light emitting devices 232 at a first luminance value smaller than the preset luminance value in the sub-frame belonging to the second sub-frame group, and turn on the one of the plurality of light emitting devices 232 at the preset luminance value in all of the sub-frames (sub-frames #1, #2, #3, . . . #127) belonging to the first sub-frame group.

In this case, the processor 150 may determine the first luminance value of the sub-frame #128 belonging to the second sub-frame group based on the difference between the light emission period and the period of the unit frame.

For example, when the gray level required for the one of the plurality of light emitting devices 232 is 1023 (01111111111), the processor 150 may determine the light emission period as a period corresponding to 127+⅞ based on 127 (01111111), which is the upper 8 bits, and 7 (111), which is the lower 3 bits. In this case, the processor 150 may determine 127 frames (sub-frames #1, #2, #3, . . . and #127) as the first sub-frame group, and determine the remaining one sub-frame (sub-frame #128) as the second sub-frame group.

In this case, the processor 150 may control the data driver 210 such that the amplitude of the data voltage output in the 127 sub-frames belonging to the first sub-frame group among the 128 sub-frames is set to a preset amplitude and the amplitude of the data voltage output in the one sub-frame belonging to the second sub-frame group is set to ⅞ of the amplitude of the data voltage output in the other sub-frames in the second sub-frame group.

According to another embodiment, when the light emission period of the one of the plurality of light emitting devices 232 is shorter than the period of one sub-frame among the plurality of sub-frames, the processor 150 may determine all of the plurality of sub-frames as the second sub-frame group, and may turn on the one of the plurality of light emitting devices 232 in at least one first sub-frame among sub-frames belonging to the second sub-frame group at a luminance value smaller than the preset luminance value.

In this case, the processor 150 may determine the number of the at least one first sub-frame and the luminance value of the at least one first sub-frame based on the gray level.

Referring to FIG. 11, when the gray level required for the one of the plurality of light emitting devices 232 is 2 (00000000110), the processor 150 may determine the light emission period to be a period corresponding to 6/8, and determine all of the 128 frames (sub-frames #1, #2, #3 . . . and #128) as the second sub-frame group.

In this case, the processor 150 may determine the number of first sub-frames belonging to the second sub-frame group as one, and control the data driver 210 such that the amplitude of the data voltage output in a sub-frame #1, which is one arbitrary first sub-frame, is set to 6/8 of the preset amplitude.

In addition, the processor 150 may determine the number of the first sub-frames to be three, and control the data driver 210 such that the amplitude of the data voltage output in sub-frames #1, #3, and #5, which are three arbitrary first sub-frames, is preset to 2/8 of the preset amplitude.

As described above, according to the disclosure, in a low luminance region in which the gray level required for the one of the plurality of light emitting devices 232 is smaller than a preset value, the amount of the current flowing through the one of the plurality of light emitting devices 232 is fixed and the period during which the current is output is controlled so that the screen uniformity of the device 1 may be increased.

In addition, according to the disclosure, the wavelength of the one of the plurality of light emitting devices 232 may be prevented from changing according to a change in current.

In addition, according to the disclosure, all gray levels may be expressed even when the number of sub-frames does not correspond to the number of bits expressing the gray level by controlling the magnitude of the current flowing through the one of the plurality of light emitting devices 232 in any one of the sub-frames.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

In addition, the computer readable storage medium may be provided in the form of a non-transitory storage medium. Here, when a storage medium is referred to as "non-transitory," it may be understood that the storage medium is tangible and does not include a signal (e.g., an electromagnetic waves), but rather that data is semi-permanently or temporarily stored in the storage medium. For example, the 'non-transitory storage medium' may include a buffer in which data is temporarily stored.

According to one embodiment, the methods according to the various embodiments disclosed herein may be provided in a computer program product. The computer program product may be traded between a seller and a buyer as a product. The computer program product may be distributed in the form of a machine-readable storage medium (e.g., compact disc read only memory (CD-ROM)), or may be distributed through an application store (e.g., Play Store™) online (e.g., download or upload). In the case of online distribution, at least a portion of the computer program product (e.g., a downloadable app) may be stored at least semi-permanently or may be temporarily generated in a storage medium, such as a memory of a server of a manufacturer, a server of an application store, or a relay server.

Although embodiments of the disclosure have been described with reference to the accompanying drawings, a person having ordinary skilled in the art will appreciate that other specific modifications may be easily made without departing from the technical spirit or essential features of the disclosure. Therefore, the foregoing embodiments should be regarded as illustrative rather than limiting in all aspects.

What is claimed is:

1. A display device comprising:

a light emitting device; and at least one processor configured to control the light emitting device based on a gray level required for the light emitting device in a unit frame, the unit frame comprising a plurality of sub-frames;

wherein the at least one processor is further configured to:

based on the gray level being greater than a preset value, control the light emitting device to turn on with a luminance that corresponds to the gray level in all of the plurality of sub-frames by applying, in all of the plurality of sub-frames, a data voltage having an amplitude that corresponds to the gray level to the light emitting device, based on the gray level being equal to the preset value, control the light emitting device to turn on with a preset luminance that is equal to a luminance of the light emitting device at the preset value, in all of the plurality of sub-frames, by applying, in all of the plurality of sub-frames, a data voltage having a preset amplitude that corresponds to the preset luminance to the light emitting device in all of the plurality of sub-frames, and based on the gray level being smaller than the preset value, control the light emitting device to turn on with the preset luminance in all of at least one first sub-frame of the plurality of sub-frames by applying, in all of the at least one first sub-frame of the plurality of sub-frames, a data voltage having the preset amplitude that corresponds to the preset luminance to the light emitting device, to turn off in all of at least one second sub-frame of the plurality of sub-frames, and to turn off or turn on with a luminance that is smaller than the preset luminance in a third sub-frame of the plurality of sub-frames, wherein a number of the at least one first sub-frame is determined based on the gray level, wherein the plurality of sub-frames consists of only the at least one first sub-frame, the at least one second sub-frame and the third sub-frame, and wherein the data voltage having the amplitude that corresponds to the gray level is variable based on changes in the gray level but the preset amplitude is maintained at a fixed value regardless of changes in the gray level.

2. The display device of claim 1, wherein based on the gray level being smaller than the preset value, the at least one processor is further configured to, based on a light emission period corresponding to the gray level being equal to a period corresponding to all of the at least one first sub-frame, control the light emitting device to turn off in the third sub-frame of the plurality of sub-frames.

3. The display device of claim 1, wherein based on the gray level being smaller than the preset value, the at least one processor is further configured to, based on a light emission period corresponding to the gray level not being equal to a period corresponding to all of the at least one first sub-frame, control the light emitting device to turn on in the third sub-frame.

4. The display device of claim 3, wherein the at least one processor is further configured to control the light emitting device to turn on with the luminance, corresponding to a difference between the light emission period and the period corresponding to all of the at least one first sub-frame, in the third sub-frame.

5. The display device of claim 4, wherein the preset luminance is greater than the luminance corresponding to the difference between the light emission period and the period corresponding to all of the at least one first sub-frame.

6. The display device of claim 1, wherein the at least one processor is configured to determine the luminance that corresponds to the gray level based on the gray level being greater than or equal to the preset value.

7. The display device of claim 1, wherein the at least one processor is configured to determine a light emission period corresponding to the gray level based on the gray level being smaller than the preset value.

8. The display device of claim 7, wherein the at least one processor is configured to determine the number of the at least one first sub-frame based on the light emission period.

9. A method of controlling a display device comprising a light emitting device, the method comprising:

controlling the light emitting device based on a gray level required for the light emitting device in a unit frame, the unit frame comprising a plurality of sub-frames, wherein the controlling the light emitting device comprises:

based on the gray level being greater than a preset value, controlling the light emitting device to turn on with a luminance that corresponds to the gray level in all of the plurality of sub-frames by applying, in all of the plurality of sub-frames, a data voltage having an amplitude that corresponds to the gray level to the light emitting device;

based on the gray level being equal to the preset value, controlling the light emitting device to turn on with a preset luminance that is equal to a luminance of the light emitting device at the preset value, in all of the plurality of sub-frames, by applying, in all of the plurality of sub-frames, a data voltage having a preset amplitude that corresponds to the preset luminance to the light emitting device in all of the plurality of sub-frames, and based on the gray level being smaller than the preset value, controlling the light emitting device to turn on with the preset luminance in all of at least one first sub-frame of the plurality of sub-frames by applying, in all of the at least one first sub-frame of the plurality of sub-frames, a data voltage having the preset amplitude that corresponds to the preset luminance to the light emitting device, to turn off in all of at least one second sub-frame of the plurality of sub-frames, and to turn off or turn on with a luminance that is smaller than the preset luminance in a third sub-frame of the plurality of sub-frames, wherein a number of the at least one first sub-frame is determined based on the gray level, wherein the plurality of sub-frames consists of only the at least one first sub-frame, the at least one second sub-frame and the third sub-frame, and wherein the data voltage having the amplitude that corresponds to the gray level is variable based on changes in the gray level but the preset amplitude is maintained at a fixed value regardless of changes in the gray level.

10. The method of claim 9, wherein the controlling the light emitting device to turn off or turn on with the luminance that is smaller than the preset luminance in the third sub-frame comprises:

based on a light emission period corresponding to the gray level being equal to a period corresponding to all of the at least one first sub-frame, controlling the light emitting device to turn off in the third sub-frame of the plurality of sub-frames.

11. The method of claim 9, wherein the controlling the light emitting device to turn off or turn on with the luminance that is smaller than the preset luminance in the third sub-frame comprises:

based on a light emission period corresponding to the gray level not being equal to a period corresponding to all of the at least one first sub-frame, controlling the light emitting device to turn on in the third sub-frame.

12. The method of claim 11, wherein the controlling the light emitting device to turn on with the luminance that is smaller than the preset luminance in the third sub-frame comprises:

controlling the light emitting device to turn on with the luminance, corresponding to a difference between the light emission period and the period corresponding to all of the at least one first sub-frame, in the third sub-frame.

13. The method of claim 12, wherein the preset luminance is greater than the luminance corresponding to the difference between the light emission period and the period corresponding to all of the at least one first sub-frame.

14. The method of claim 9, wherein the controlling the light emitting device further comprises determining the luminance that corresponds to the gray level based on the gray level being greater than or equal to the preset value.

15. The method of claim 9, wherein the controlling the light emitting device further comprises determining a light emission period corresponding to the gray level based on the gray level being smaller than the preset value.

16. The method of claim 15, wherein the controlling the light emitting device further comprises determining the number of the at least one first sub-frame based on the light emission period.

* * * * *